United States Patent
Sun et al.

(10) Patent No.: US 10,385,459 B2
(45) Date of Patent: Aug. 20, 2019

(54) ADVANCED LAYERED BULK CERAMICS VIA FIELD ASSISTED SINTERING TECHNOLOGY

(71) Applicant: Applied Materials, Inc., Santa Clara, CA (US)

(72) Inventors: Jennifer Y. Sun, Mountain View, CA (US); Yikai Chen, Santa Clara, CA (US); Biraja Prasad Kanungo, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 269 days.

(21) Appl. No.: 14/712,059

(22) Filed: May 14, 2015

(65) Prior Publication Data

US 2015/0329430 A1 Nov. 19, 2015

Related U.S. Application Data

(60) Provisional application No. 61/994,272, filed on May 16, 2014, provisional application No. 62/004,613, filed on May 29, 2014.

(51) Int. Cl.
*C04B 35/622* (2006.01)
*B32B 9/04* (2006.01)
(Continued)

(52) U.S. Cl.
CPC .............. *C23C 24/10* (2013.01); *B32B 9/048* (2013.01); *B32B 18/00* (2013.01); *B32B 37/06* (2013.01); *C04B 35/62222* (2013.01); *C23C 28/042* (2013.01); *B32B 2305/77* (2013.01); *B32B 2315/02* (2013.01); *C04B 2235/5454* (2013.01); *C04B 2235/604* (2013.01); *C04B 2235/666* (2013.01); *C04B 2237/34* (2013.01); *C04B 2237/343* (2013.01); *C04B 2237/348* (2013.01);
(Continued)

(58) Field of Classification Search
CPC ....... C23C 24/10; C23C 28/042; B32B 9/048; B32B 18/00; B32B 37/06; B32B 2305/77; B32B 2315/02; C04B 35/62222; C04B 2235/5454; C04B 2235/604; C04B 2235/666; C04B 2237/34; C04B 2237/343; C04B 2237/348; C04B 2237/365; C04B 2237/366; C04B 2237/368
USPC ....................................... 427/580
See application file for complete search history.

(56) References Cited

U.S. PATENT DOCUMENTS 8,293,335 B2  10/2012  Chang
2001/0027159 A1  10/2001  Kaneyoshi
(Continued)

OTHER PUBLICATIONS

Shackelford, J.F., William, A., "CRC Materials Science and Engineering Handbook", 2001, Taylor & Francis, 3r Ed., p. 1 (Year: 2001).*

(Continued)

*Primary Examiner* — Katherine A Bareford
*Assistant Examiner* — Christina D McClure
(74) *Attorney, Agent, or Firm* — Lowenstein Sandler LLP

(57) ABSTRACT

Disclosed herein are methods for fabricating layered ceramic materials via field assisted sintering technology. A method includes forming a ceramic green body on a surface of a substrate, and sintering the ceramic green body using a field-assisted sintering process to form a ceramic layer joined to the substrate.

20 Claims, 9 Drawing Sheets

(51) Int. Cl.
  *C04B 35/505* (2006.01)
  *C23C 24/10* (2006.01)
  *B32B 37/06* (2006.01)
  *C23C 28/04* (2006.01)
  *B32B 18/00* (2006.01)

(52) U.S. Cl.
  CPC .. *C04B 2237/365* (2013.01); *C04B 2237/366* (2013.01); *C04B 2237/368* (2013.01)

(56) References Cited

U.S. PATENT DOCUMENTS

| | | | | |
|---|---|---|---|---|
| 2003/0049499 | A1* | 3/2003 | Murakawa | C04B 35/18 428/697 |
| 2003/0049500 | A1* | 3/2003 | Takai | C04B 35/44 428/702 |
| 2003/0215643 | A1* | 11/2003 | Morita et al. | C04B 35/486 428/409 |
| 2006/0172073 | A1* | 8/2006 | Groza | B22F 7/08 427/421.1 |
| 2008/0169588 | A1* | 7/2008 | Shih | H01J 9/24 264/423 |
| 2010/0119843 | A1* | 5/2010 | Sun | H01J 37/32477 428/426 |
| 2010/0129670 | A1* | 5/2010 | Sun | H01J 37/32477 428/432 |
| 2012/0111224 | A1* | 5/2012 | Tontrup | B22C 1/08 106/15.05 |
| 2013/0052442 | A1* | 2/2013 | Merrill et al. | B22F 7/02 428/220 |
| 2013/0085055 | A1* | 4/2013 | Raj | B23K 9/00 501/1 |
| 2015/0099188 | A1* | 4/2015 | Holme | H01M 10/0525 429/231.95 |

OTHER PUBLICATIONS

John S.C. Francis, et al., "Flash-Sinterforging of Nanograin Zirconia; Field Assisted Sintering and Superplasticity", Department of Mechanical Engineering, University of Colorado at Boulder, 2011 Journal of the American Ceramic Society, pp. 138-146, vol. 95, No. 1.

Hidehiro Yoshida, et al., Densification Behaviour and Microstructural Development in Undoped Yttria Prepared by Flash-Sintering, National Institute for Materials Science, Sengen, Tsukuba, Ibaraki 305-0047, Japan, Department of Quantum Engineering, Nagoya University, Furo-cho, Chikusa-ku, Nagoya, Aichi 464-8601, Japan, Department of Mechanical Engineering, University of Colorado at Boulder, Journal of the European Ceramic Society, 2013 Elsevier Ltd., vol. 34, Issue 4, Apr. 2014, ISSN 0955-2219, pp. 991-1000.

Marc Cologna, et al., "Flash Sintering of Nanograin Zirconia in <5 s at 850 degrees C", Department of Mechanical Engineering, University of Colorado at Boulder, Boulder, Co, Department of Materials Physics, Erich Schmid Institut for Materials Science, Austrian Academy of Sciences, Erich Schmid Institute of Materials Science, Jahnstrasse 12, 8700 Leoben, Austria, 2010 Rapid Communications of the American Ceramic Society, pp. 3556-3559, vol. 93, No. 11.

\* cited by examiner

ADVANCED LAYERED BULK CERAMICS VIA FIELD ASSISTED SINTERING TECHNOLOGY

CROSS REFERENCE TO RELATED APPLICATIONS

This application claims the benefit of priority of U.S. Provisional Patent Application No. 61/994,272, filed May 16, 2014, and U.S. Provisional Patent Application No. 62/004,613, filed May 29, 2014.

TECHNICAL FIELD

Embodiments of the present invention relate, in general, to bulk ceramics for semiconductor processing chamber components.

BACKGROUND

In the semiconductor industry, devices are fabricated by a number of manufacturing processes producing structures of ever-decreasing size. Some manufacturing processes such as plasma etch and plasma clean processes expose a substrate support (e.g., an edge of the substrate support during wafer processing and the full substrate support during chamber cleaning) to a high-speed stream of plasma to etch or clean the substrate. The plasma may be highly corrosive, and may corrode processing chambers and other surfaces that are exposed to the plasma.

Sintering technology has been used to produce bulk ceramics, such as manufacturing chamber components. However, traditional sintering technologies may not be appropriate for the production of some advanced, erosion resistant bulk ceramics such as advanced layered bulk ceramics that include nanostructured layers. Moreover, traditional sintering technologies typically consume significant time and use high temperatures, which ultimately drives up the cost of production.

SUMMARY

Embodiments of the present disclosure relate to the production of layered bulk ceramics via field-assisted sintering technology. In one embodiment, a method includes providing a substrate and forming a ceramic green body on a surface of the substrate. The ceramic green body is sintered using field-assisted sintering to form a bulk ceramic joined to the substrate.

In another embodiment, a method includes contacting a first ceramic green body with a second ceramic green body. The first and second ceramic green bodies are sintered using field-assisted sintering (e.g., flash sintering and/or spark plasma sintering) and joined together.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Embodiments of the present invention provide a substrate, such as a chamber component for a processing chamber. One or more ceramic layers may be formed on the substrate by forming one or more ceramic green bodies on the substrate and sintering the ceramic green bodies using a field-assisted sintering technique such as flash sintering to form dense ceramic layers joined to the substrate and/or each other. The ceramic layers may serve as protective layers. Each ceramic green body or resulting ceramic layer may have a composition of one or more of $Y_3Al_5O_{12}$ (YAG), $Y_4Al_2O_9$ (YAM), $Y_2O_3$, $Er_2O_3$, $Gd_2O_3$, $Gd_3Al_5O_{12}$ (GAG), $YF_3$, $Nd_2O_3$, $Er_4Al_2O_9$, $Er_3Al_5O_{12}$ (EAG), $ErAlO_3$, $Gd_4Al_2O_9$, $GdAlO_3$, $Nd_3Al_5O_{12}$, $Nd_4Al_2O_9$, $NdAlO_3$, or a ceramic compound composed of $Y_4Al_2O_9$ and a solid-solution of $Y_2O_3$—$ZrO_2$. The improved erosion resistance provided by one or more of the disclosed ceramic layers may improve the service life of the chamber component, while reducing maintenance and manufacturing cost. Ceramic layers formed by flash sintering and other field-assisted sintering techniques such as spark plasma sintering may be formed rapidly (on the seconds scale) and at relatively low temperatures (<1000° C.) compared to traditional sintering technologies. The rapid and low temperature field-assisted sintering techniques may advantageously save significant time and energy in the fabrication process. Moreover, flash sintering or spark plasma sintering of multiple ceramic green bodies may enable the production of complex shaped bulk ceramics having varied compositions based on the ceramic green bodies used.

Figure 1:
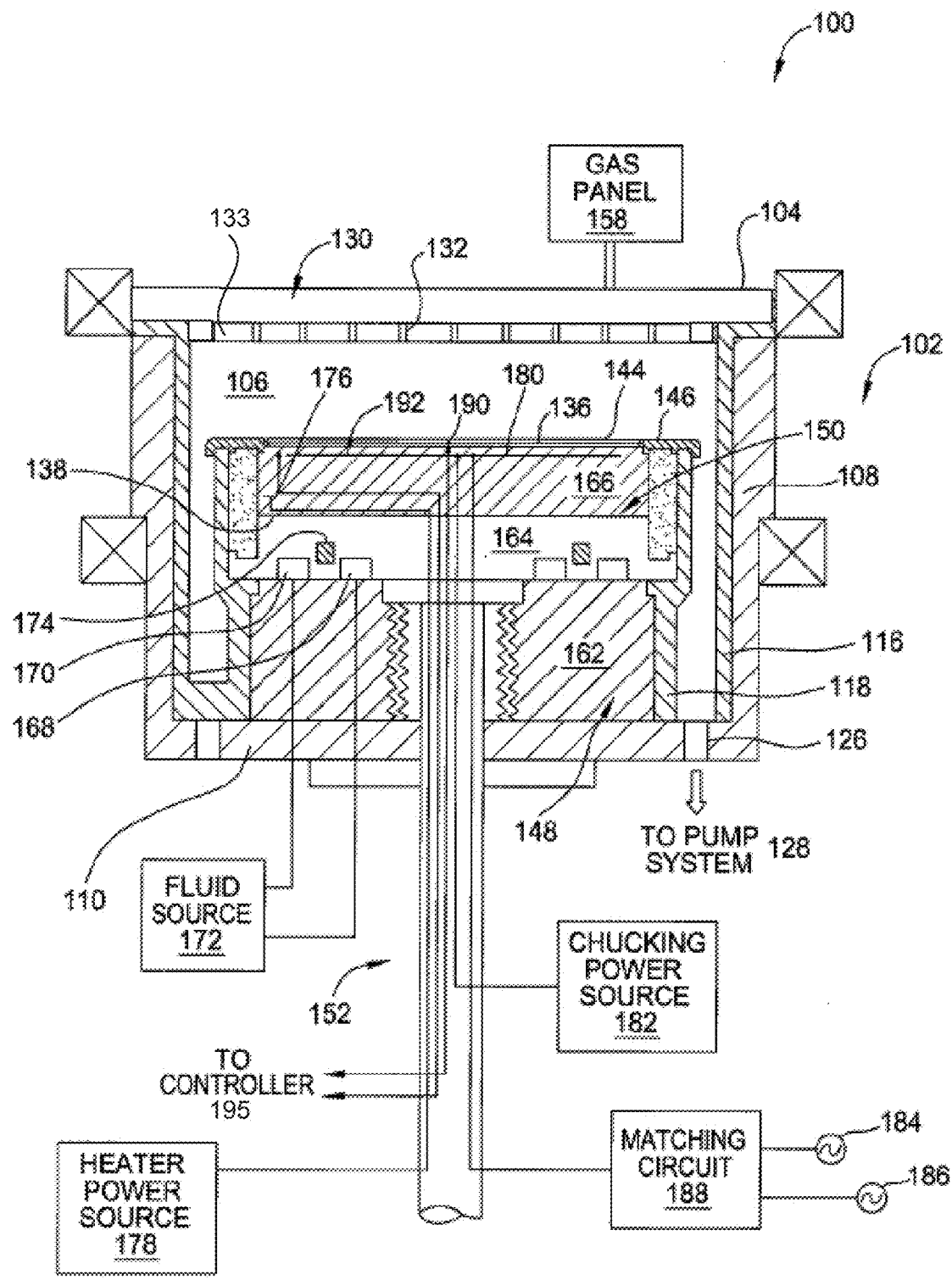
FIG. 1 depicts a sectional view of a processing chamber according to an embodiment.

FIG. 1 is a sectional view of a semiconductor processing chamber 100 having one or more chamber components that are coated with a ceramic layer in accordance with embodiments of the present invention. The processing chamber 100 may be used for processes in which a corrosive plasma environment is provided. For example, the processing chamber 100 may be a chamber for a plasma etcher or plasma etch reactor, a plasma cleaner, and so forth. Examples of chamber components that may include a ceramic layer include a substrate support assembly 148, an electrostatic chuck (ESC) 150, a ring (e.g., a process kit ring or single ring), a chamber wall, a base, a gas distribution plate, a showerhead, a liner, a liner kit, a shield, a plasma screen, a flow equalizer, a cooling base, a chamber viewport, a chamber lid 104, and so on. The ceramic layer, which is described in greater detail below, may be a flash sintered protective layer (or protective layer formed using other field-assisted sintering techniques) that includes one or more of $Y_3Al_5O_{12}$, $Y_4Al_2O_9$, $Y_2O_3$, $Er_2O_3$, $Gd_2O_3$, $Gd_3Al_5O_{12}$, $YF_3$, $Nd_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, $NdAlO_3$, or a ceramic compound composed of $Y_4Al_2O_9$ and a solid-solution of $Y_2O_3$—$ZrO_2$. As illustrated, the substrate support assembly 148 has a ceramic layer 136, in accordance with one embodiment. However, it should be understood that any of the other chamber components, such as those listed above, may also include a ceramic layer.

In one embodiment, the processing chamber 100 includes a chamber body 102 and a showerhead 130 that enclose an interior volume 106. Alternatively, the showerhead 130 may be replaced by a lid and a nozzle in some embodiments. The chamber body 102 may be fabricated from aluminum, stainless steel or other suitable material. The chamber body 102 generally includes sidewalls 108 and a bottom 110. One or more of the showerhead 130 (or lid and/or nozzle), sidewalls 108 and/or bottom 110 may include a ceramic layer.

An outer liner 116 may be disposed adjacent the sidewalls 108 to protect the chamber body 102. The outer liner 116 may be fabricated and/or coated with a ceramic layer. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 100.

The showerhead 130 may be supported on the sidewall 108 of the chamber body 102. The showerhead 130 (or lid) may be opened to allow access to the interior volume 106 of the processing chamber 100, and may provide a seal for the processing chamber 100 while closed. A gas panel 158 may be coupled to the processing chamber 100 to provide process and/or cleaning gases to the interior volume 106 through the showerhead 130 or lid and nozzle. Showerhead 130 may be used for processing chambers used for dielectric etch (etching of dielectric materials). The showerhead 130 includes a gas distribution plate (GDP) 133 having multiple gas delivery holes 132 throughout the GDP 133. The showerhead 130 may include the GDP 133 bonded to an aluminum base or an anodized aluminum base. The GDP 133 may be made from Si or SiC, or may be a ceramic such as $Y_2O_3$, $Al_2O_3$, YAG, and so forth.

For processing chambers used for conductor etch (etching of conductive materials), a lid may be used rather than a showerhead. The lid may include a center nozzle that fits into a center hole of the lid. The lid may be a ceramic such as $Al_2O_3$, $Y_2O_3$, YAG, or a ceramic compound composed of $Y_4Al_2O_9$ and a solid-solution of $Y_2O_3$—$ZrO_2$. The nozzle may also be a ceramic, such as $Y_2O_3$, YAG, or the ceramic compound composed of $Y_4Al_2O_9$ and a solid-solution of $Y_2O_3$—$ZrO_2$. The lid, base of showerhead 130, GDP 133 and/or nozzle may be coated with a ceramic layer.

Examples of processing gases that may be used to process substrates in the processing chamber 100 include halogen-containing gases, such as $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. Examples of carrier gases include $N_2$, He, Ar, and other gases inert to process gases (e.g., non-reactive gases). The substrate support assembly 148 is disposed in the interior volume 106 of the processing chamber 100 below the showerhead 130 or lid. The substrate support assembly 148 holds the substrate 144 during processing. A ring 146 (e.g., a single ring) may cover a portion of the electrostatic chuck 150, and may protect the covered portion from exposure to plasma during processing. The ring 146 may be silicon or quartz in one embodiment.

An inner liner 118 may be coated on the periphery of the substrate support assembly 148. The inner liner 118 may be a halogen-containing gas resistant material such as those discussed with reference to the outer liner 116. In one embodiment, the inner liner 118 may be fabricated from the same materials of the outer liner 116. Additionally, the inner liner 118 may be coated with a ceramic layer.

In one embodiment, the substrate support assembly 148 includes a mounting plate 162 supporting a pedestal 152, and an electrostatic chuck 150. The electrostatic chuck 150 further includes a thermally conductive base 164 and an electrostatic puck 166 bonded to the thermally conductive base by a bond 138, which may be a silicone bond in one embodiment. An upper surface of the electrostatic puck 166 is covered by the ceramic layer 136 in the illustrated embodiment. In one embodiment, the ceramic layer 136 is disposed on the upper surface of the electrostatic puck 166. In another embodiment, the ceramic layer 136 is disposed on the entire exposed surface of the electrostatic chuck 150 including the outer and side periphery of the thermally conductive base 164 and the electrostatic puck 166. The mounting plate 162 is coupled to the bottom 110 of the chamber body 102 and includes passages for routing utilities (e.g., fluids, power lines, sensor leads, etc.) to the thermally conductive base 164 and the electrostatic puck 166.

The thermally conductive base 164 and/or electrostatic puck 166 may include one or more optional embedded heating elements 176, embedded thermal isolators 174 and/or conduits 168, 170 to control a lateral temperature profile of the substrate support assembly 148. The conduits 168, 170 may be fluidly coupled to a fluid source 172 that circulates a temperature regulating fluid through the conduits 168, 170. The embedded thermal isolator 174 may be disposed between the conduits 168, 170 in one embodiment. The heater 176 is regulated by a heater power source 178. The conduits 168, 170 and heater 176 may be utilized to control the temperature of the thermally conductive base 164, which may be used for heating and/or cooling the electrostatic puck 166 and a substrate 144 (e.g., a wafer) being processed. The temperature of the electrostatic puck 166 and the thermally conductive base 164 may be monitored using a plurality of temperature sensors 190, 192, which may be monitored using a controller 195.

The electrostatic puck 166 may further include multiple gas passages such as grooves, mesas and other surface features, which may be formed in an upper surface of the electrostatic puck 166 and/or the ceramic layer 136. The gas passages may be fluidly coupled to a source of a heat transfer (or backside) gas such as helium via holes drilled in the electrostatic puck 166. In operation, the backside gas may be provided at controlled pressure into the gas passages to enhance the heat transfer between the electrostatic puck 166 and the substrate 144. The electrostatic puck 166 includes at least one clamping electrode 180 controlled by a chucking power source 182. The clamping electrode 180 (or other electrode disposed in the electrostatic puck 166 or conductive base 164) may further be coupled to one or more RF power sources 184, 186 through a matching circuit 188 for maintaining a plasma formed from process and/or other gases within the processing chamber 100. The power sources 184, 186 are generally capable of producing an RF signal having a frequency from about 50 kHz to about 3 GHz, with a power output of up to about 10,000 Watts.

Figure 2:
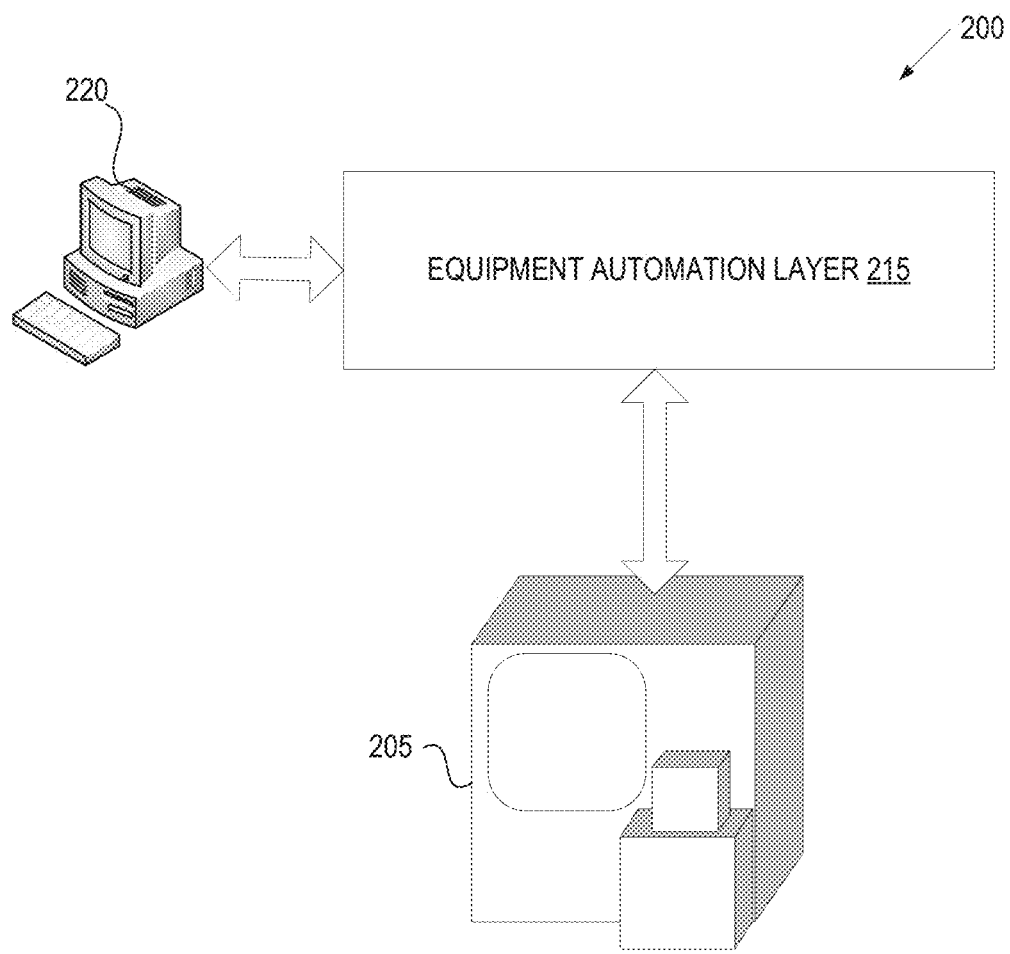
FIG. 2 depicts an exemplary architecture of a manufacturing system according to an embodiment.

FIG. 2 illustrates an exemplary architecture of a manufacturing system, in accordance with one embodiment of the present invention. The manufacturing system 200 may be a ceramics manufacturing system, which may include the processing chamber 100. In some embodiments, the manufacturing system 200 may be a processing chamber for manufacturing, cleaning, or modifying a chamber component of the processing chamber 100. In one embodiment, the manufacturing system 200 includes a chamber 205 (e.g., a flash sintering chamber or spark plasma sintering chamber), an equipment automation layer 215, and a computing device 220. In alternative embodiments, the manufacturing system 200 may include more or fewer components. For example, the manufacturing system 200 may include only the chamber 205, which may be a manual off-line machine.

The chamber 205 may be a machine designed to heat articles such as ceramic articles or perform a process, such as flash sintering or spark plasma sintering. The chamber 205 may include a thermally insulated chamber, or oven, capable of applying a controlled temperature on articles (e.g., ceramic articles and/or green bodies) inserted therein. In one embodiment, the chamber is hermitically sealed. The chamber 205 may include a pump to pump air out of the chamber, and thus to create a vacuum within. The chamber 205 may additionally or alternatively include a gas inlet to pump gasses (e.g., inert gasses such as Ar or $N_2$) into its interior.

The chamber 205 may include a manual furnace having a temperature controller that is manually set by a technician during processing of ceramic articles. The chamber 205 may also be an off-line machine that can be programmed with a process recipe. The process recipe may control ramp up rates, ramp down rates, process times, temperatures, pressure, gas flows, applied voltage potentials, electrical currents, and so on. Alternatively, chamber 205 may be an on-line automated machine that can receive process recipes from computing devices 220 (e.g., personal computers, server machines, etc.) via an equipment automation layer 215. The equipment automation layer 215 may interconnect the chamber 205 with computing devices 220, with other manufacturing machines, with metrology tools, and/or other devices.

The equipment automation layer 215 may include a network (e.g., a location area network (LAN)), routers, gateways, servers, data stores, and so on. The chamber 205 may connect to the equipment automation layer 215 via a SEMI Equipment Communications Standard/Generic Equipment Model (SECS/GEM) interface, via an Ethernet interface, and/or via other interfaces. In one embodiment, the equipment automation layer 215 enables process data (e.g., data collected by the chamber 205 during a process run) to be stored in a data store (not shown). In an alternative embodiment, the computing device 220 connects directly to the chamber 205.

In one embodiment, the chamber 205 includes a programmable controller that can load, store and execute process recipes. The programmable controller may control temperature settings, gas and/or vacuum settings, time settings, applied voltage potentials, electrical currents, etc. of a flash sintering process or spark plasma sintering process of the chamber 205. The programmable controller may control a chamber heat up, may enable temperature to be ramped down as well as ramped up, may enable multi-step heat treating to be input as a single process, and so forth. The programmable controller may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing flash sintering and/or spark plasma sintering processes, as described herein.

The programmable controller may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device, such as an application specific integrated circuit (ASIC), a field programmable gate array (FPGA), a digital signal processor (DSP), a network processor, or the like. In one embodiment, programmable controller is a programmable logic controller (PLC).

Figure 3:
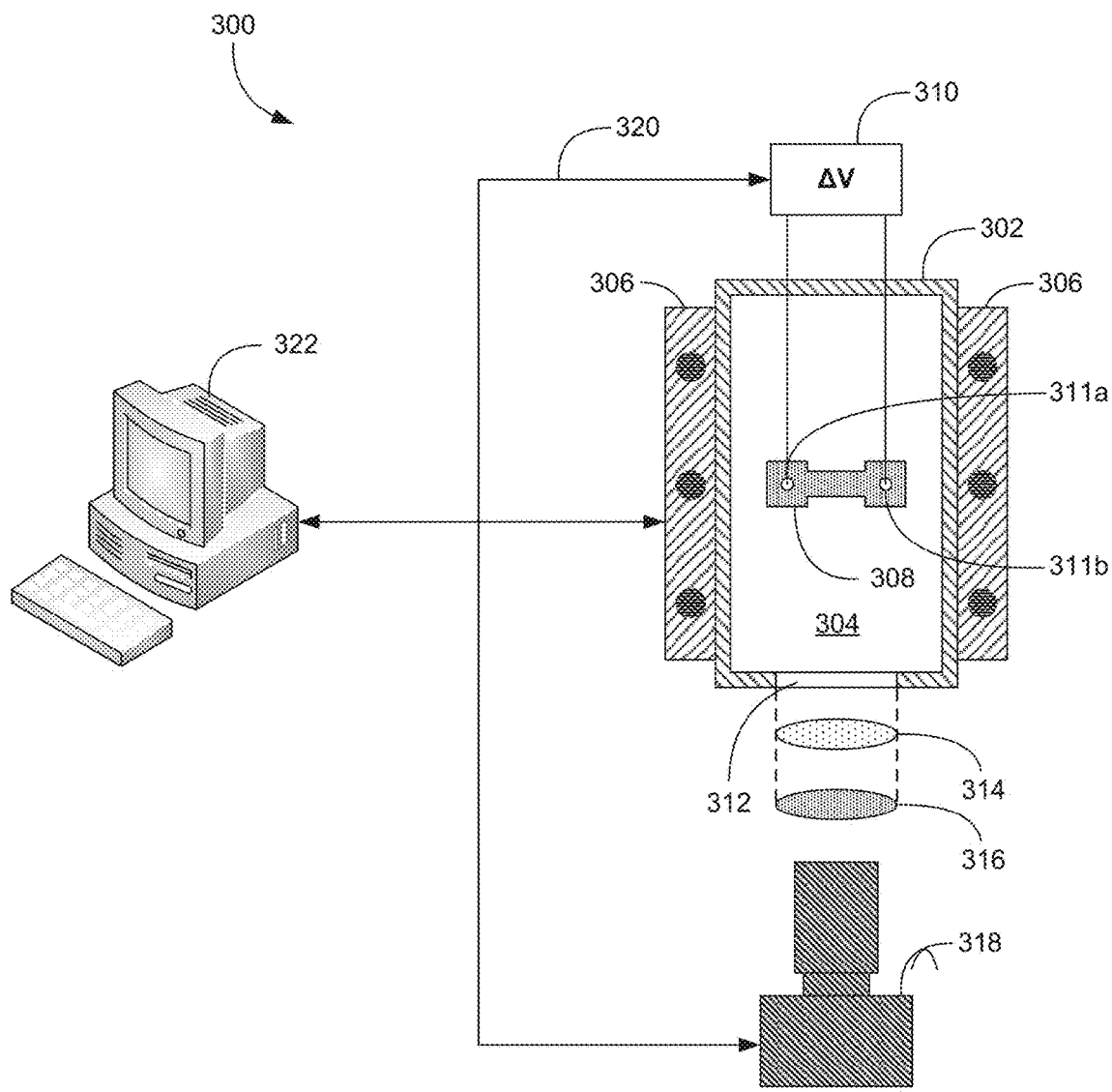
FIG. 3 depicts a sectional view of a field-assisted sintering chamber according to an embodiment.

FIG. 3 depicts a sectional view of a field-assisted sintering chamber according to an embodiment. For example, sintering system 300 may be the same or similar to manufacturing system 200 described with respect to FIG. 2. Sintering system 300 may be configured to perform field-assisted sintering, including spark plasma sintering or flash sintering. Spark plasma sintering utilizes a pulsed electric current and compressive forces applied to a sample. Flash sintering utilizes an electric field applied to a sample while the sample is held at or above a threshold temperature.

Sintering system 300 includes a chamber 302 having an interior 304 for loading and processing a sample 308. In some embodiments, the interior 304 may be a sealed chamber capable of maintaining low or high pressure conditions, and may be coupled to appropriate gas flow sources. In some embodiments, the chamber 302 includes a furnace 306, which may enclose the chamber 302, for example, in a cylindrical fashion. The furnace 306 may be programmable, and include one or more temperature sensors disposed within the chamber 302 to provide feedback utilized to maintain a desired temperature. The furnace 306 may also be capable of ramping to a desired temperature at a desired rate. In some embodiments, the furnace 306 may be operatively coupled to a computing device 322 (which may be the same or similar to computing device 220 described with respect to FIG. 2) using, for example, a communications path 320. The computing device 322 may run one or many stored recipes (which may be pre-defined or operator-defined) that control the conditions of the furnace 306.

The chamber 302 may include a window 312 and one or more filters 314, 316 for viewing the sample 308. The window 312 and filters 314, 316 are depicted in FIG. 3 as an exploded view, and may be a single unit. In some embodiments, the filters 314, 316 may be any suitable type of filter, such as polarizing filters. A camera 318 may be placed near the window 312 to view the sample 308, or may be formed integrally with the chamber 302. In some embodiments, the filters 314, 316 are a part of the camera 318. The camera may be operatively coupled to the computing device 322 via the communications path 320, and the computing device 322 may provide a suitable user interface (UI) for viewing images, recorded video, or live video captured by the camera, and may allow an operator to control camera settings (e.g., focus, zoom, etc.).

To perform field-assisted sintering, a voltage source 310 is connected to the sample 308 in order to apply a voltage potential across the sample 308. The voltage source 310 may be operatively coupled to the computing device 322 via the communications path, and the applied potential may be controlled using the UI of the computing device 322. In some embodiments, flash sintering or spark plasma sintering may be performed on the sample 308 by connecting electrodes 311a, 311b to the sample. For example, the electrode 311a may be an anode and the electrode 311b may be a cathode. The electrodes 311a, 311b may be connected to the sample 308 in such a way that an effectively uniform electric field (e.g., generated by the voltage source 310) is distributed throughout the sample when the voltage potential is applied during field-assisted sintering (e.g., at opposite ends of the sample 308). In some embodiments, additional electrodes may be utilized, for example, when sintering complex shapes. For example, multiple anodes may be attached to different portions of a green body, and a single cathode may be attached to an opposite end of the green body such that current flows from each of the anodes to the cathode, resulting in an electric field (and current density) that is effectively uniform through the ceramic green body.

The sample 308 is depicted as a dog-bone shaped sample in FIG. 3. However, any suitable shape may be processed. In some embodiments, the sample 308 processed in the chamber 302 may be a green powder compact (or "green body"). The terms "green powder compact" and "green body" refer to a pliable, moldable material composed of small, tightly packed particles, which melt and join together to form a dense ceramic layer upon sintering.

In some embodiments, the green body may be in the form of a slurry. For example, the slurry may a slurry of ceramic particles within a solvent. The solvent may include a low molecular weight polar solvent, including, but not limited to, ethanol, methanol, acetonitrile, water, or combinations thereof. In some embodiments, a pH of the slurry may be between about 5 and 12 to promote stability of the slurry. The slurry may have high viscosity to allow the slurry to be shaped into a desired shape prior to sintering.

In some embodiments, a mass-median-diameter (D50) of the particles in the slurry, which is the average particle diameter by mass, may be between about 10 nanometers and 10 micrometers. In some embodiments, a D50 of the particles may be greater than 10 micrometers. In some embodiments, the slurry may be referred to as a nanoparticle slurry when the D50 of the particles is less than 1 micrometer. In some embodiments, the particles may have compositions that include one or more of $Er_2O_3$, $Gd_2O_3$, $Gd_3Al_5O_{12}$, $YF_3$, $Nd_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, or $NdAlO_3$.

In some embodiments, a single green body may be pressed or deposited (e.g., by dip-coating, a doctor blade technique, extrusion, etc.) onto a substrate, such as a ceramic base. In some embodiments, a ceramic green body may be placed between two substrates, such that the two substrates will be joined together after the ceramic green body is flash sintered or spark plasma sintered. In some embodiments, multiple green bodies may be placed on a substrate. In some embodiments, two or more green bodies may be pressed together, and may each have different compositions. In some embodiments, one or more of the ceramic green bodies may be a slurry (e.g., a nanoparticle slurry). Each green body may have one or more of the aforementioned compositions.

Figure 4A:
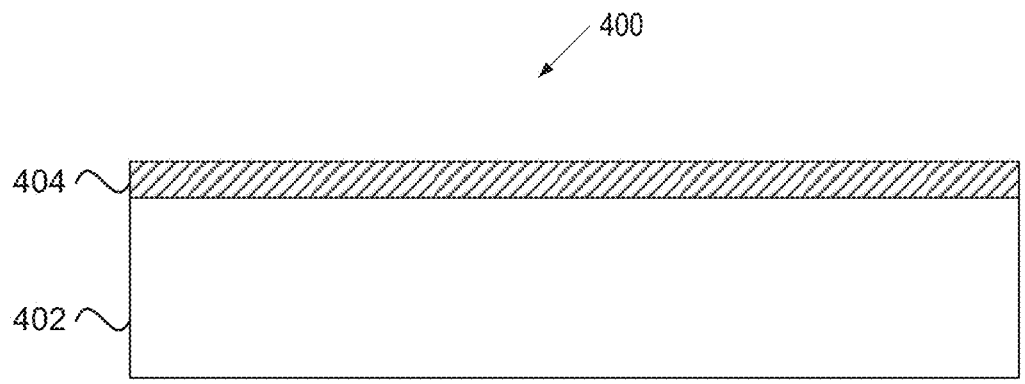
FIGS. 4A-4D depict sectional side views of exemplary substrates with one or more ceramic green bodies disposed thereon according to an embodiment.

FIGS. 4A-4D depict sectionals view of exemplary substrates with one or more ceramic green bodies disposed thereon according to embodiments. FIG. 4A shows single-layer-coated article 400. The article may be a flat substrate 402, which may be, for example, a ceramic substrate composed of one or more of $Al_2O_3$, AlN, SiN, or SiC. The substrate 402 includes a ceramic green body 404 disposed thereon. In some embodiments, the ceramic green body 404 may have been formed, for example, by hot or cold pressing of the ceramic green body 404 with a shaping die. In some embodiments, the ceramic green body 404 may be a slurry that was deposited (e.g., by dip-coating, a doctor blade technique, extrusion, etc.) onto the surface of the substrate 402. In some embodiments, a thickness of the ceramic green body 404 may range from 1 micrometer to 100 micrometers. In some embodiments, the thickness of the ceramic green body 404 may be greater than 100 micrometers.

The article 400 may be loaded into the chamber 302 of the sintering system 300 to perform flash sintering or other field-assisted sintering, yielding a dense ceramic layer that is joined to the substrate 402. For example, an electric field may be applied to the ceramic green body 404 while it is incubated at a flash sintering threshold temperature, yielding a ceramic layer. In some embodiments, the electric field may be applied (e.g., using the electrodes 311a, 311b) to the sides of the ceramic green body 404 so that current flows longitudinally along the green body 404. In some embodiments, one electrode may be placed in contact with some or all of a top surface of the green body 404 and another electrode may be placed in contact with a bottom surface of the substrate 402 (for example, if the substrate 402 is an electrically conductive substrate). The ceramic layer may be joined to the substrate 402 by diffusion from the substrate 402 and the ceramic green body 404 across the interface between the substrate and the ceramic green body 404.

Figure 4B:
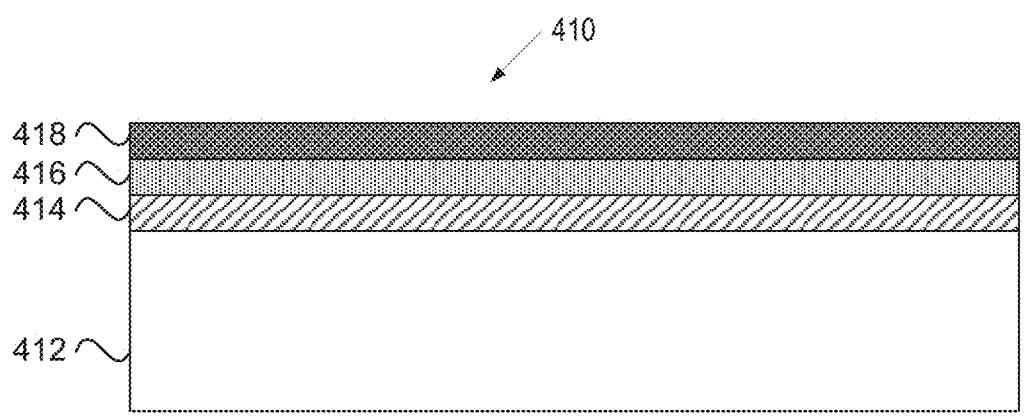

Referring to FIG. 4B, a multi-layer-coated article 410 is depicted as a substrate 412 having first 414, second, 416, and third 418 ceramic green bodies disposed thereon in a layered fashion (e.g., a stack). In a similar manner as described with respect to FIG. 4A, flash sintering or spark plasma sintering may be performed on the article 410 to produce a substrate 412 coated with multiple ceramic layers. The first ceramic green body 414 may form a ceramic layer that joins to the substrate 412, while the second 416 and third 418 ceramic green bodies each join to the first 414 and second ceramic green bodies, resulting in a multi-layered ceramic layer. In some embodiments, electrodes (such as the electrodes 311a, 311b) may be placed at opposite ends of the multi-layer-coated article 410 such that each of the electrodes contacts all three layers, resulting in longitudinal current flow along each of the ceramic green bodies 414, 416, and 418. In some embodiments, if the substrate 412 is an electrically conductive substrate, one electrode may be placed in contact with some or all of a top surface of the third ceramic green body 418 and another electrode may be placed at a bottom surface of the substrate 412.

In some embodiments, the ceramic green bodies 414, 416, and 418 may each be composed of the same ceramic material. In some embodiments, the ceramic green bodies 434, 436, and 438 may each be composed of different ceramic materials, or may have alternating compositions (e.g., the first 414 and third 418 ceramic green bodies may be the same and the second ceramic green body 416 may be different). In some embodiments, more or less than three ceramic green body layers may be coated onto the substrate 412. In some embodiments, the thicknesses of each layer of the stack may vary, with thicknesses of any suitable range described herein (e.g., described with respect to the ceramic green body 404).

Figure 4C:
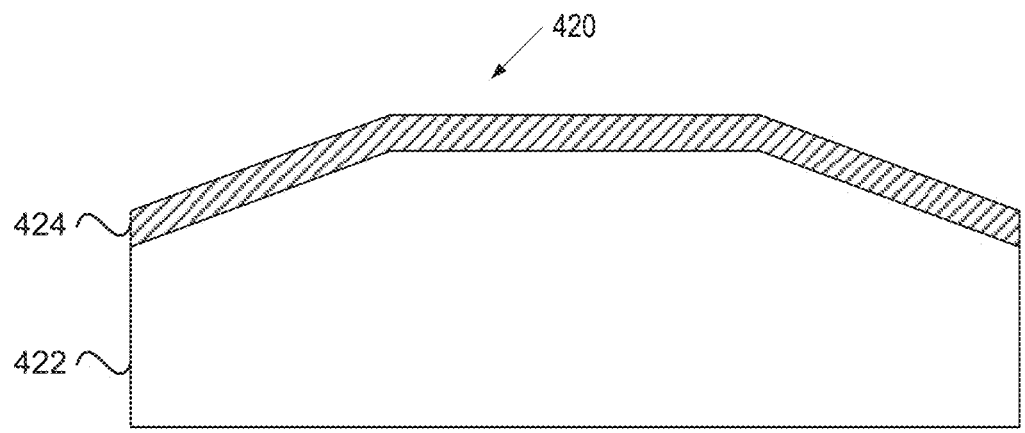
Figure 4D:
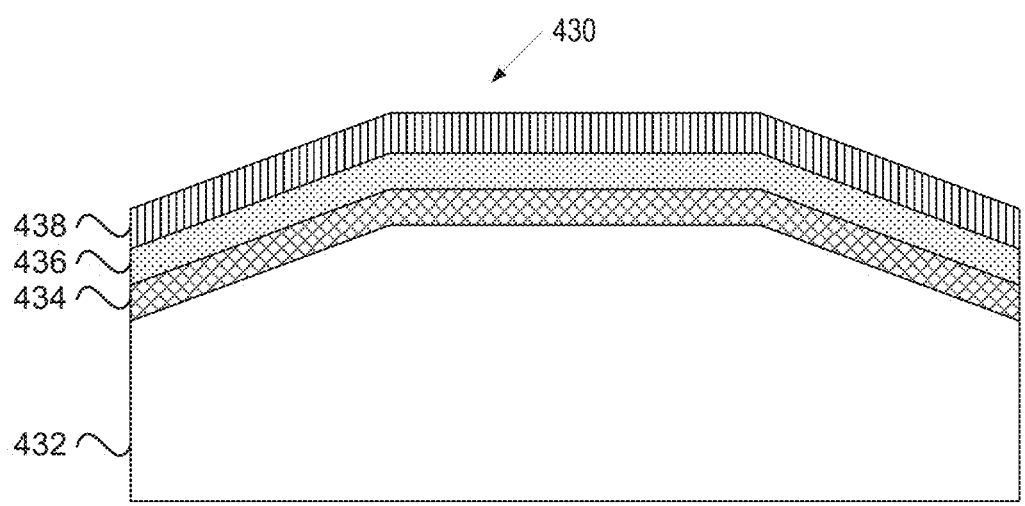

Referring to FIGS. 4C and 4D, field-assisted sintering techniques such as flash sintering and spark plasma sintering can be performed on chamber components to produce dense ceramic layers thereon. For example, FIG. 4C depicts a single-layer-coated chamber component 420 that comprises a substrate 422 having a ceramic green body 424 disposed thereon, and FIG. 4D depicts a multi-layer-coated chamber component 430. Each of substrates 422 and 432 may be any chamber component described with respect to FIG. 1, including substrate support assembly, an electrostatic chuck (ESC), a ring (e.g., a process kit ring or single ring), a chamber wall, a base, a gas distribution plate or showerhead, a liner, a liner kit, a shield, a plasma screen, a flow equalizer, a cooling base, a chamber viewport, a chamber lid, and so on. The substrates 422 and 432 may be metals, ceramics, metal-ceramic composites, polymers, or polymer-ceramic composites.

Various chamber components are composed of different materials. For example, an electrostatic chuck may be composed of a ceramic such as $Al_2O_3$ (alumina), AlN (aluminum nitride), TiO (titanium oxide), TiN (titanium nitride) or SiC (silicon carbide) bonded to an anodized aluminum base. $Al_2O_3$, AlN and anodized aluminum have poor plasma erosion resistance. When exposed to a plasma environment with a fluorine chemistry and/or reducing chemistry, an electrostatic puck of an electrostatic chuck may exhibit degraded wafer chucking, increased helium leakage rate, wafer front-side and back-side particle production and on-wafer metal contamination after about 50 radio frequency hours (RFHrs) of processing. A radio frequency hour is an hour of processing.

A lid for a plasma etcher used for conductor etch processes may be a sintered ceramic such as $Al_2O_3$ since $Al_2O_3$ has a high flexural strength and high thermal conductivity. However, $Al_2O_3$ exposed to fluorine chemistries forms AlF particles as well as aluminum metal contamination on wafers. Some chamber lids have a thick film protective layer on a plasma facing side to minimize particle generation and metal contamination and to prolong the life of the lid. However, most thick film coating techniques have a long lead time. Additionally, for most thick film coating techniques special surface preparation is performed to prepare the article to be coated (e.g., the lid) to receive the coating. Such long lead times and coating preparation steps can increase cost and reduce productivity, as well as inhibit refurbishment. Additionally, most thick-film coatings have inherent cracks and pores that might degrade on-wafer defect performance.

A process kit ring and a single ring may be used to seal and/or protect other chamber components, and are typically manufactured from quartz or silicon. These rings may be disposed around a supported substrate (e.g., a wafer) to ensure a uniform plasma density (and thus uniform etching). However, quartz and silicon have very high erosion rates under various etch chemistries (e.g., plasma etch chemistries). Additionally, such rings may cause particle contamination when exposed to plasma chemistries. The process kit ring and single ring may also consist of sintered ceramics such as $Y_2O_3$, YAG and/or a ceramic compound composed of $Y_4Al_2O_9$ and a solid-solution of $Y_2O_3$—$ZrO_2$.

A showerhead for an etcher used to perform dielectric etch processes is typically made of anodized aluminum bonded to a SiC faceplate. When such a showerhead is exposed to plasma chemistries including fluorine, AlF may form due to plasma interaction with the anodized aluminum base. Additionally, a high erosion rate of the anodized aluminum base may lead to arcing and ultimately reduce a mean time between cleaning for the showerhead.

The examples provided above set forth just a few chamber components whose performance may be improved by use of a flash sintered or spark plasma sintered protective layer as set forth in embodiments herein.

Referring back to FIGS. 4C and 4D, the substrate 422 of the chamber component 420 and the substrate 432 of the chamber component 430 each may include one or more surface features. For an electrostatic chuck, surface features may include mesas, sealing bands, gas channels, helium holes, and so forth. For a showerhead, surface features may include a bond line, hundreds or thousands of holes for gas distribution, divots or bumps around gas distribution holes, and so forth. Other chamber components may have other surface features.

Referring to FIG. 4D, at least a portion of a substrate 432 of the chamber component 430 is coated with first 434, second 436, and third 438 ceramic green bodies, similar to the article 410 of FIG. 4B. The ceramic green bodies 414, 416, and 418 in the stack may all have the same thickness, or they may have varying thicknesses. Flash sintering or spark plasma sintering of the chamber component 430 produces a multi-layer ceramic layer joined to the surface of the chamber component 430.

Figure 4E:
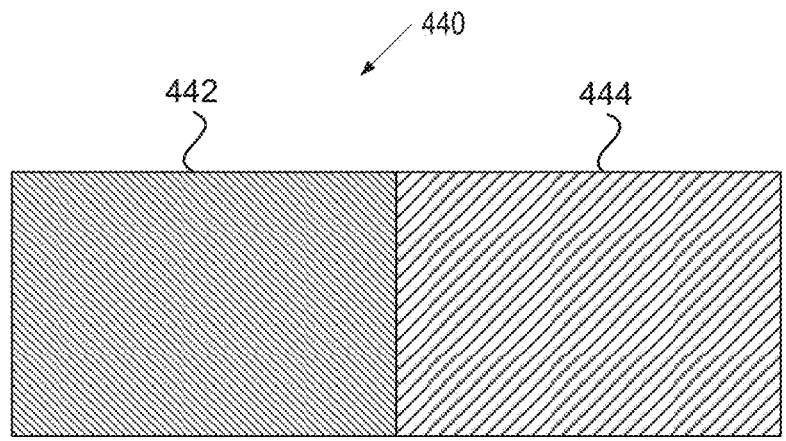
FIGS. 4E and 4F depict sectional views of ceramic green bodies joined together in the absence of a substrate according to an embodiment.

Referring to FIG. 4E, a multi-component green body 440 includes first 442 and second 444 ceramic green bodies, which may be composed of different ceramic materials. Flash sintering or spark plasma sintering may be performed on the multi-component green body 440 to produce a single contiguous ceramic body composed of different types of ceramic materials separated by a boundary. In some embodiments, electrodes (such as the electrodes 311a, 311b) may be placed at opposite ends of the multi-component green body 440. For example, the electrode 311a may be placed in contact with some or all of an outer surface of the first ceramic green body 442, and the electrode 311b may be placed on an outer surface of the second ceramic green body 444. In some embodiments, the electrode 311a may be placed at least partially in contact with top surfaces of each of the first 442 and second 444 ceramic green bodies, and the electrode 311b may be placed at least partially in contact with bottom surfaces of each of the first 442 and second 444 ceramic green bodies.

Figure 4F:
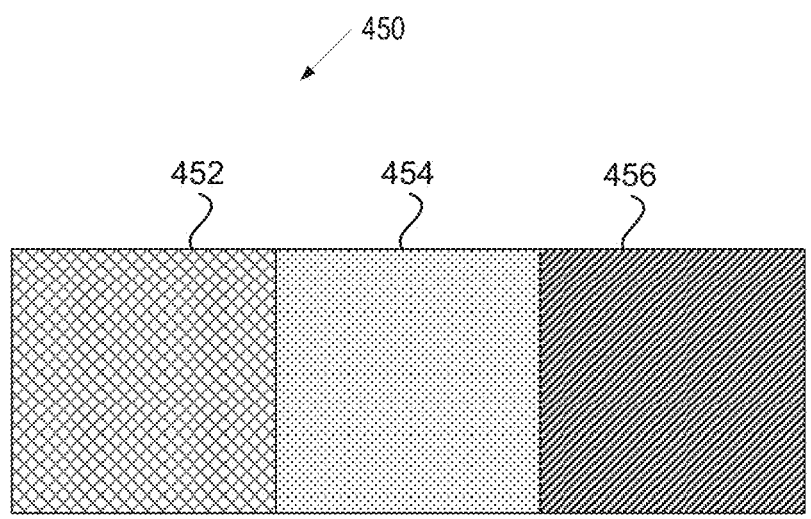

Referring to FIG. 4F, a multi-component green body 450 includes first 452, second 454, and third 456 ceramic green bodies, which may be composed of different ceramic materials. The multi-component green body 450 may be sintered in a similar fashion as the multi-component green body 440. FIGS. 4E and 4F are merely illustrative, as any number of ceramic green bodies may be joined together by flash sintering or spark plasma sintering to produce complex shaped and/or multi-layered ceramic materials. In some embodiments, electrodes (such as the electrodes 311a, 311b) may be placed at opposite ends of the multi-component green body 450. For example, the electrode 311a may be placed in contact with some or all of an outer surface of the first ceramic green body 452, and the electrode 311b may be placed on an outer surface of the third ceramic green body 456. In some embodiments, the electrode 311a may be placed at least partially in contact with top surfaces of each of the first 452, second 454, and third 456 ceramic green bodies, and the electrode 311b may be placed at least partially in contact with bottom surfaces of each of the first 452, second 454, and third 456 ceramic green bodies.

Any of the ceramic green bodies or ceramic layers/bodies produced by flash sintering (or field-assisted sintering in general) of ceramic green bodies may be based on a solid solution formed by any of the aforementioned ceramics. With reference to the ceramic compound composed of $Y_4Al_2O_9$ and a solid-solution of $Y_2O_3$—$ZrO_2$, in one embodiment, the ceramic compound includes 62.93 molar ratio (mol %) $Y_2O_3$, 23.23 mol % $ZrO_2$ and 13.94 mol %

$Al_2O_3$. In another embodiment, the ceramic compound can include $Y_2O_3$ in a range of 50-75 mol %, $ZrO_2$ in a range of 10-30 mol % and $Al_2O_3$ in a range of 10-30 mol %. In another embodiment, the ceramic compound can include $Y_2O_3$ in a range of 40-100 mol %, $ZrO_2$ in a range of 0-60 mol % and $Al_2O_3$ in a range of 0-10 mol %. In another embodiment, the ceramic compound can include $Y_2O_3$ in a range of 40-60 mol %, $ZrO_2$ in a range of 30-50 mol % and $Al_2O_3$ in a range of 10-20 mol %. In another embodiment, the ceramic compound can include $Y_2O_3$ in a range of 40-50 mol %, $ZrO_2$ in a range of 20-40 mol % and $Al_2O_3$ in a range of 20-40 mol %. In another embodiment, the ceramic compound can include $Y_2O_3$ in a range of 70-90 mol %, $ZrO_2$ in a range of 0-20 mol % and $Al_2O_3$ in a range of 10-20 mol %. In another embodiment, the ceramic compound can include $Y_2O_3$ in a range of 60-80 mol %, $ZrO_2$ in a range of 0-10 mol % and $Al_2O_3$ in a range of 20-40 mol %. In another embodiment, the ceramic compound can include $Y_2O_3$ in a range of 40-60 mol %, $ZrO_2$ in a range of 0-20 mol % and $Al_2O_3$ in a range of 30-40 mol %. In another embodiment, the ceramic compound can include $Y_2O_3$ in a range of 30-60 mol %, $ZrO_2$ in a range of 0-20 mol % and $Al_2O_3$ in a range of 30-60 mol %. In another embodiment, the ceramic compound can include $Y_2O_3$ in a range of 20-40 mol %, $ZrO_2$ in a range of 20-80 mol % and $Al_2O_3$ in a range of 0-60 mol %. In other embodiments, other distributions may also be used for the ceramic compound.

In one embodiment, an alternative ceramic compound that includes a combination of $Y_2O_3$, $ZrO_2$, $Er_2O_3$, $Gd_2O_3$ and $SiO_2$ is used for the ceramic layer. In one embodiment, the alternative ceramic compound can include $Y_2O_3$ in a range of 40-45 mol %, $ZrO_2$ in a range of 0-10 mol %, $Er_2O_3$ in a range of 35-40 mol %, $Gd_2O_3$ in a range of 5-10 mol % and SiO2 in a range of 5-15 mol %. In another embodiment, the alternative ceramic compound can include $Y_2O_3$ in a range of 30-60 mol %, $ZrO_2$ in a range of 0-20 mol %, $Er_2O_3$ in a range of 20-50 mol %, $Gd_2O_3$ in a range of 0-10 mol % and SiO2 in a range of 0-30 mol %. In a first example, the alternative ceramic compound includes 40 mol % $Y_2O_3$, 5 mol % $ZrO_2$, 35 mol % $Er_2O_3$, 5 mol % $Gd_2O_3$ and 15 mol % $SiO_2$. In a second example, the alternative ceramic compound includes 45 mol % $Y_2O_3$, 5 mol % $ZrO_2$, 35 mol % $Er_2O_3$, 10 mol % $Gd_2O_3$ and 5 mol % $SiO_2$. In a third example, the alternative ceramic compound includes 40 mol % $Y_2O_3$, 5 mol % $ZrO_2$, 40 mol % $Er_2O_3$, 7 mol % $Gd_2O_3$ and 8 mol % $SiO_2$. In one embodiment, the ceramic layer includes 70-75 mol % $Y_2O_3$ and 25-30 mol % $ZrO_2$. In a further embodiment, the ceramic layer is a material entitled YZ20 that includes 73.13 mol % $Y_2O_3$ and 26.87 mol % $ZrO_2$.

Any of the aforementioned ceramic layers may include trace amounts of other materials such as $ZrO_2$, $Al_2O_3$, $SiO_2$, $B_2O_3$, $Er_2O_3$, $Nd_2O_3$, $Nb_2O_5$, $CeO_2$, $Sm_2O_3$, $Yb_2O_3$, or other oxides. In one embodiment, the same ceramic material is not used for two adjacent ceramic layers. However, in another embodiment adjacent layers may be composed of the same ceramic.

Figure 5:
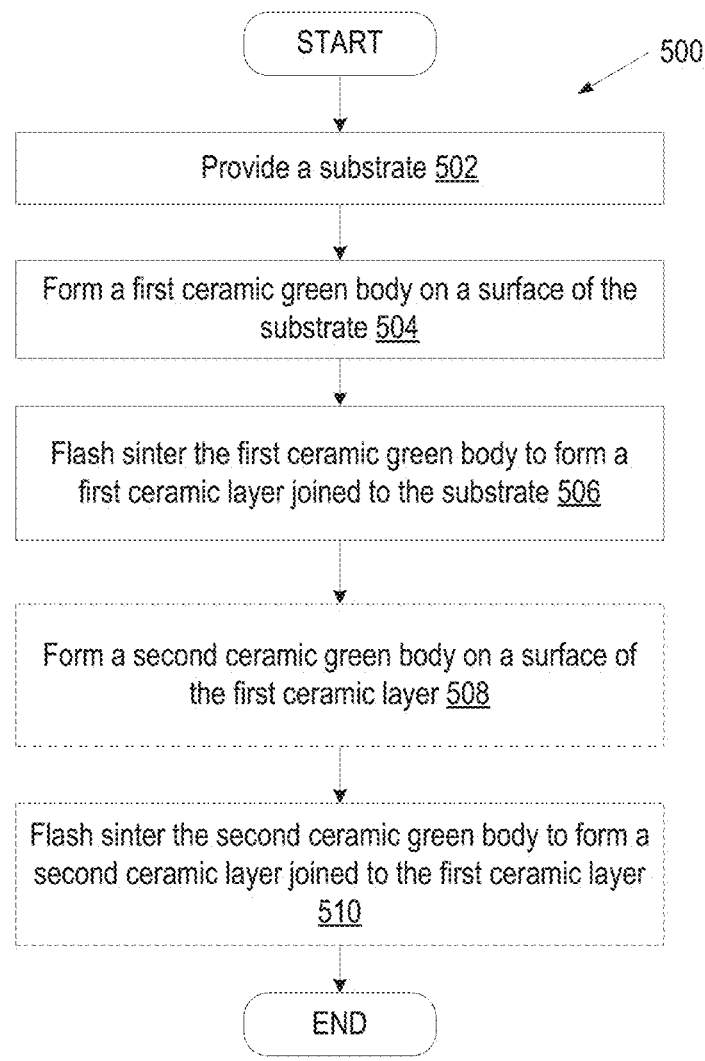
FIG. 5 is a flow diagram illustrating a process for joining a ceramic green body to a substrate according to an embodiment.

FIG. 5 is a flow diagram illustrating a process 500 for joining a ceramic green body to a substrate according to an embodiment. At block 502, a substrate is provided. In some embodiments, the substrate may be a suitable chamber component as described with respect to FIG. 1. For example, the substrate could be any of, but not limited to, a lid, a nozzle, an electrostatic chuck (e.g., ESC 150), a showerhead (e.g., showerhead 130), a liner (e.g., outer liner 116 or inner liner 118) or liner kit, or a ring (e.g., ring 146). The substrate may be a pre-sintered ceramic substrate, and may be composed of one or more of $Al_2O_3$, AlN, SiN, or SiC. In one embodiment, the pre-sintered ceramic material is composed of at least one of $Y_3Al_5O_{12}$, $Y_4Al_2O_9$, $Y_2O_3$, $Er_2O_3$, $Gd_2O_3$, $Er_3Al_5O_{12}$, $Gd_3Al_5O_{12}$, $YF_3$, $Nd_2O_3$, $Er_4Al_2O_9$, $ErAlO_3$, $Gd_4Al_2O_9$, $GdAlO_3$, $Nd_3Al_5O_{12}$, $Nd_4Al_2O_9$, $NdAlO_3$, or a ceramic compound comprising $Y_4Al_2O_9$ and a solid-solution of $Y_2O_3$—$ZrO_2$. In one embodiment, the substrate was pre-sintered using field-assisted sintering such as flash sintering. Alternatively, the substrate may have been pre-sintered using standard sintering technology. In one embodiment, the substrate itself is a ceramic green body.

At block 504, a first ceramic green body is formed on the surface of the substrate. The first ceramic green body may be formed by pressing the first ceramic green body onto the substrate (e.g., hot or cold pressing using a shaping die). In some embodiments, the first ceramic green body is a slurry, which may have been dip-coated onto the surface of the substrate. The green body may alternatively be placed onto the surface using other techniques, such as a doctor blade technique, extrusion, and so forth.

At block 506, the first ceramic green body is flash sintered to form a first ceramic layer joined to the substrate (e.g., by flash sintering using the sintering system 300). Alternatively, the first ceramic green body may be sintered using another field assisted sintering technique, such as spark plasma sintering. The substrate with the first ceramic green body may be placed in a sintering chamber (e.g., the chamber 302). A temperature of the chamber may be ramped up to a desired temperature (e.g., using the computing device 322 to control the ramping rate and desired temperature of the furnace 306). The desired temperature may be a threshold sintering temperature at which an electric field is applied to the first ceramic green body using two or more electrodes (e.g. using the electrodes 311a and 311b connected to the voltage source 310) to induce densification of the first ceramic green body into a ceramic layer. The threshold sintering temperature may be below 1000° C., and in some embodiments between 500° C. and 900° C. In some embodiments, a temperature ramping rate may be between 1° C./min and 10° C./min. Once the threshold sintering temperature is reached, an electric field is applied to the first ceramic green body. In some embodiments, the electric field is between 50 V/cm and 1000 V/cm, and may be applied between 2 seconds and 20 seconds. The temperature and/or the strength of the electric field may be based on the composition of the green body, the physical dimensions of the green body, and/or other parameters.

At block 508, a second ceramic green body is formed on a surface of the first ceramic layer. The second ceramic green body may be formed on the surface of the first ceramic layer according to any suitable embodiment described herein. In other embodiments, block 508 may be omitted entirely (e.g., to produce a substrate with a single ceramic layer).

At block 510, the second ceramic green body is flash sintered or spark plasma sintered to form a second ceramic layer joined to the first ceramic layer. Flash sintering or spark plasma sintering of the second ceramic green body may be performed in accordance with any of the embodiments described herein (e.g., as described with respect to block 506). In other embodiments, block 510 may be omitted entirely (e.g., to produce a substrate with a single ceramic layer).

In some embodiments of process 500, flash sintering or spark plasma sintering is performed multiple times for each green body layer used. In some embodiments, a single sintering process may be performed, as described below with respect to FIG. 6.

Figure 6:
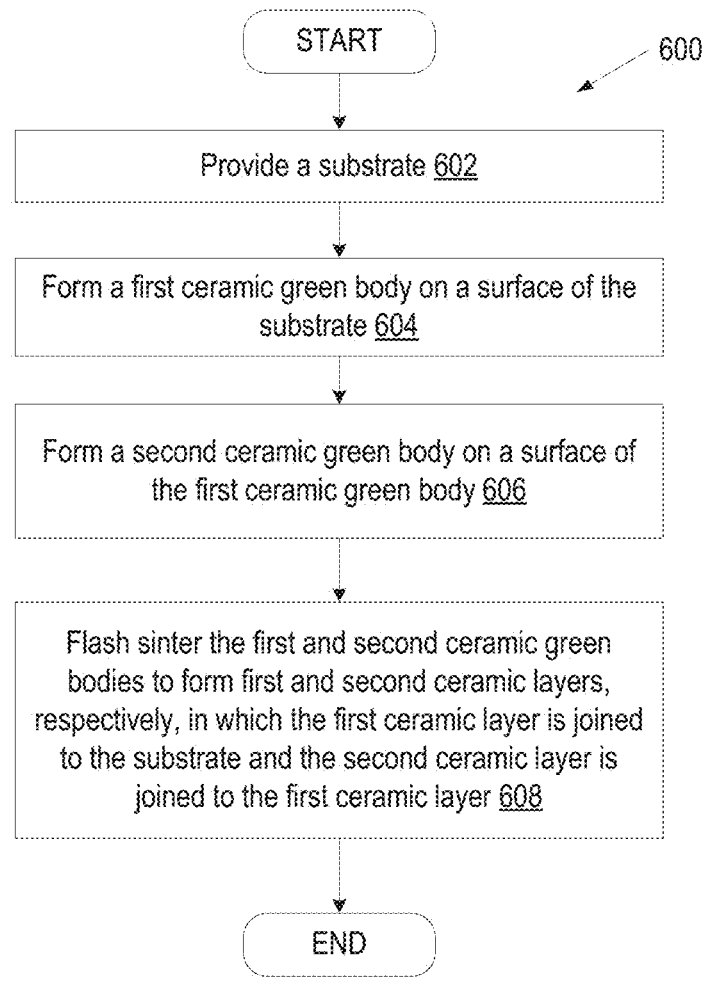
FIG. 6 is a flow diagram illustrating a process for joining a multi-layered ceramic green body to a substrate according to an embodiment.

FIG. 6 is a flow diagram illustrating a process 600 for joining a multi-layered ceramic green body to a substrate according to an embodiment. At block 602, a substrate is provided. Block 602 may be the same or similar to block 502 described with respect to FIG. 5.

At block 604, a first ceramic green body is formed on a surface of the substrate. Block 604 may be the same or similar to block 504 described with respect to FIG. 5.

At block 606, a second ceramic green body is formed on a surface of the first ceramic green body. The second ceramic green body may be formed using any suitable approach.

At block 608, the first and second ceramic green bodies are flash sintered or spark plasma sintered to form first and second ceramic layers, respectively, in which the first ceramic layer is joined to the substrate, and the second ceramic layer is joined to the first ceramic layer. The flash sintering or spark plasma sintering may be performed in a manner similar to that described with respect to block 506 of FIG. 5.

Figure 7:
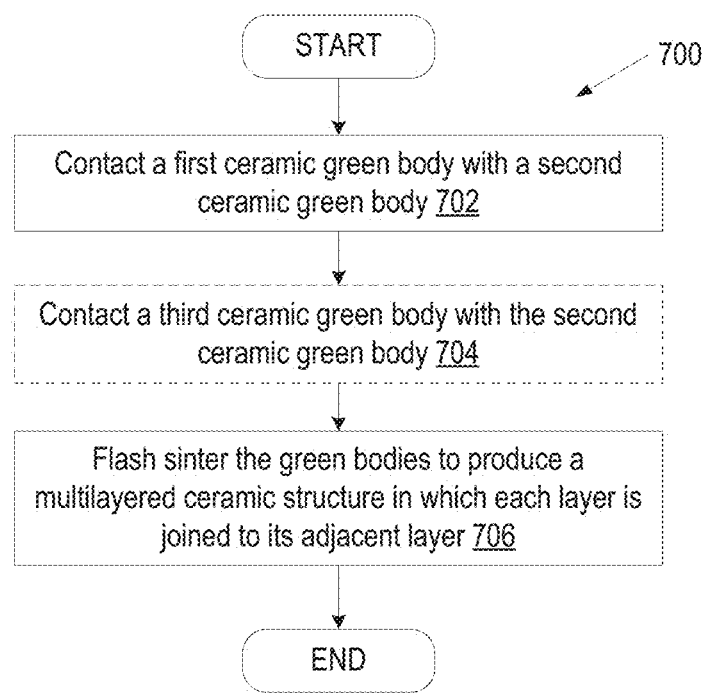
FIG. 7 is a flow diagram illustrating a process for joining two ceramic green bodies together according to an embodiment.

FIG. 7 is a flow diagram illustrating a process 700 for joining two ceramic green bodies together according to an embodiment. At block 702, a first ceramic green body is contacted with a second ceramic green body. For example, respective surfaces of the first and second ceramic green bodies may contact each other forming an interface. In some embodiments, the first and second ceramic green bodies are layered on top of each other, for example as depicted in FIG. 4E. The first ceramic green body and the second ceramic green body may have roughly the same shape or may have different shapes. In one embodiment, the second ceramic green body covers an entire surface of the first ceramic green body. In another embodiment, the second ceramic green body covers just a portion of a surface of the first ceramic green body. For example, if the first ceramic green body is to form a lid, and the second ceramic green body is to form a protective layer on the lid, then a perimeter of a surface of the first ceramic green body may not be covered by the second ceramic green body. In one embodiment, the second ceramic green body is a nanoparticle slurry that has been dip-coated onto the first ceramic green body.

At block 704, a third ceramic green body is contacted with the second ceramic green body. In some embodiments, the third ceramic green body may be a layer disposed the second ceramic green body. In some embodiments, block 704 may be repeated to produce, for example, a multi-layered stack of ceramic green bodies. In other embodiments, block 704 may be omitted entirely.

At block 706, the first and second (as well as third, fourth, etc.) ceramic green bodies may be flash sintered or spark plasma sintered to produce a multi-layered ceramic structure in which each layer is joined to its adjacent layer, or each ceramic green forms a ceramic structure that is bonded to whichever other ceramic structure it is in contact with. The flash sintering or spark plasma sintering may be performed in a manner similar to that described with respect to block 506 of FIG. 5. In some embodiments, electrodes used in sintering are placed at opposite ends of the multi-layered stack of ceramic green bodies.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular embodiments may vary from these exemplary details and still be contemplated to be within the scope of the present disclosure.

Reference throughout this specification to "one embodiment" or "an embodiment" indicates that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    forming a first ceramic green body on a first surface of a chamber component, wherein the first ceramic green body comprises at least one of $Er_3Al_3O_{12}$, $Gd_3Al_5O_{12}$, $Er_4Al_2O_9$, $ErAlO_3$, $Gd_4Al_2O_9$, $GdAlO_3$, $Nd_3Al_5O_{12}$, $Nd_4Al_2O_9$, $NdAlO_3$, or a ceramic compound comprising a solid-solution of $Y_2O_3$—$ZrO_2$; and
    sintering the first ceramic green body using a field-assisted sintering process to form a first ceramic layer joined to the chamber component, wherein the sintering comprises contacting a first electrode to a first side of the first ceramic green body and a second electrode to a second side of the first ceramic green body to apply an electric field to the first ceramic green body via a longitudinal current flow along the first ceramic green body.

2. The method of claim 1, further comprising:
    forming a second ceramic green body on a second surface of the first ceramic green body prior to sintering the first ceramic green body, wherein sintering the first ceramic green body further comprises sintering the second ceramic green body using the field-assisted sintering process to form a second ceramic layer joined to the first ceramic layer.

3. The method of claim 1, further comprising:
    forming a second ceramic green body on a second surface of the first ceramic layer; and
    sintering the second ceramic green body using the field-assisted sintering process to form a second ceramic layer joined to the first ceramic layer.

4. The method of claim 1, wherein the first ceramic green body is formed by pressing a moldable ceramic green body onto the chamber component, and wherein the field-assisted sintering process comprises spark plasma sintering by applying a pulsed electric current and compressive forces to the first ceramic green body.

5. The method of claim 1, wherein the first ceramic green body is a nanoparticle slurry of ceramic particles within a solvent, wherein a pH of the nanoparticle slurry may be between about 5 and 12, wherein a mass-median-diameter (D50) of the ceramic particles is between about 10 nanometers and 10 micrometers, and wherein the field-assisted sintering process comprises a flash sintering process comprising applying the electric field to the first ceramic green body while the first ceramic green body is at a temperature that meets a threshold temperature between 500° C. and 900° C.

6. The method of claim 5, wherein forming the first ceramic green body on the first surface of the chamber component comprises dip-coating the nanoparticle slurry onto the first surface of the chamber component, wherein the D50 of the ceramic particles is less than 1 micrometer.

7. The method of claim 1, wherein the first ceramic green body further comprises at least one of $Y_3Al_5O_{12}$, $Y_2O_3$, $Er_2O_3$, $Gd_2O_3$, $YF_3$, or $Nd_2O_3$.

8. The method of claim 1, wherein the chamber component comprises at least one of $Al_2O_3$, AlN, SiN, or SiC.

9. The method of claim 1, wherein the chamber component is a pre-sintered ceramic material.

10. The method of claim 9, wherein the pre-sintered ceramic material was sintered using field-assisted sintering.

11. The method of claim 9, wherein the pre-sintered ceramic material comprises at least one of $Y_3Al_5O_{12}$, $Y_4Al_2O_9$, $Y_2O_3$, $Er_2O_3$, $Gd_2O_3$, $Er_3Al_5O_{12}$, $Gd_3Al_5O_{12}$, $YF_3$, $Nd_2O_3$, $Er_4Al_2O_9$, $ErAlO_3$, $Gd_4Al_2O_9$, $GdAlO_3$, $Nd_3Al_5O_{12}$, $Nd_4Al_2O_9$, $NdAlO_3$, or the ceramic compound comprising $Y_4Al_2O_9$ and the solid-solution of $Y_2O_3$—$ZrO_2$.

12. The method of claim 1, wherein the chamber component is selected from the group consisting of: a lid, a nozzle, an electrostatic chuck, a showerhead, a liner kit, or a ring.

13. The method of claim 1, wherein the sintering comprises:
ramping, at a rate between 1° C./min and 10° C./min, temperature of a sintering chamber up to a threshold sintering temperature between 500° C. and 900° C.; and
applying the electric field between 50 V/cm and 1000 V/cm for between 2 seconds and 20 seconds to the first ceramic green body while the first ceramic green body is incubated at the threshold sintering temperature.

14. The method of claim 1, wherein the first ceramic green body comprises the ceramic compound comprising the solid-solution of $Y_2O_3$—$ZrO_2$.

15. A method comprising:
contacting a first ceramic green body with a second ceramic green body, wherein at least one of the first ceramic green body or the second ceramic green body comprises a ceramic compound comprising a solid-solution of $Y_2O_3$—$ZrO_2$; and
flash sintering the first and second ceramic green bodies to join the first and second ceramic green bodies together, wherein the flash sintering comprises contacting a first electrode to a first end of the first and second ceramic green bodies and a second electrode to a second end of the first and second ceramic green bodies to apply an electric field to the first and second ceramic green bodies via a longitudinal current flow along each of the first and second ceramic green bodies.

16. The method of claim 15, wherein the second ceramic green body is a nanoparticle slurry of ceramic particles within a solvent, wherein a pH of the nanoparticle slurry may be between about 5 and 12, wherein a mass-median-diameter (D50) of the ceramic particles is between about 10 nanometers and 10 micrometers.

17. The method of claim 15, wherein the first ceramic green body is in contact with a surface of a chamber component, and wherein flash sintering the first and second ceramic green bodies further joins the first ceramic green body to the chamber component, wherein the electric field is applied to the first and second ceramic green bodies while temperature of the first and second ceramic green bodies meets a threshold sintering temperature between 500° C. and 900° C.

18. The method of claim 15, wherein each of the first and second ceramic green bodies further comprise at least one of $Y_3Al_5O_{12}$, $Y_2O_3$, $Er_2O_3$, $Gd_2O_3$, $YF_3$, or $Nd_2O_3$.

19. The method of claim 15, further comprising:
contacting the second ceramic green body with a third ceramic green body, wherein the flash sintering of the first and second ceramic green bodies further comprises applying the electric field to the third ceramic green body via the longitudinal current flow along the third ceramic green body to join the third ceramic green body to the second ceramic green body.

20. The method of claim 15, further comprising:
contacting the second ceramic green body with a third ceramic green body after the flash sintering of the first and second ceramic green bodies; and
flash sintering the third ceramic green body to join the third ceramic green body to the second ceramic green body.

* * * * *